Figures 1, 2, 3, 4:
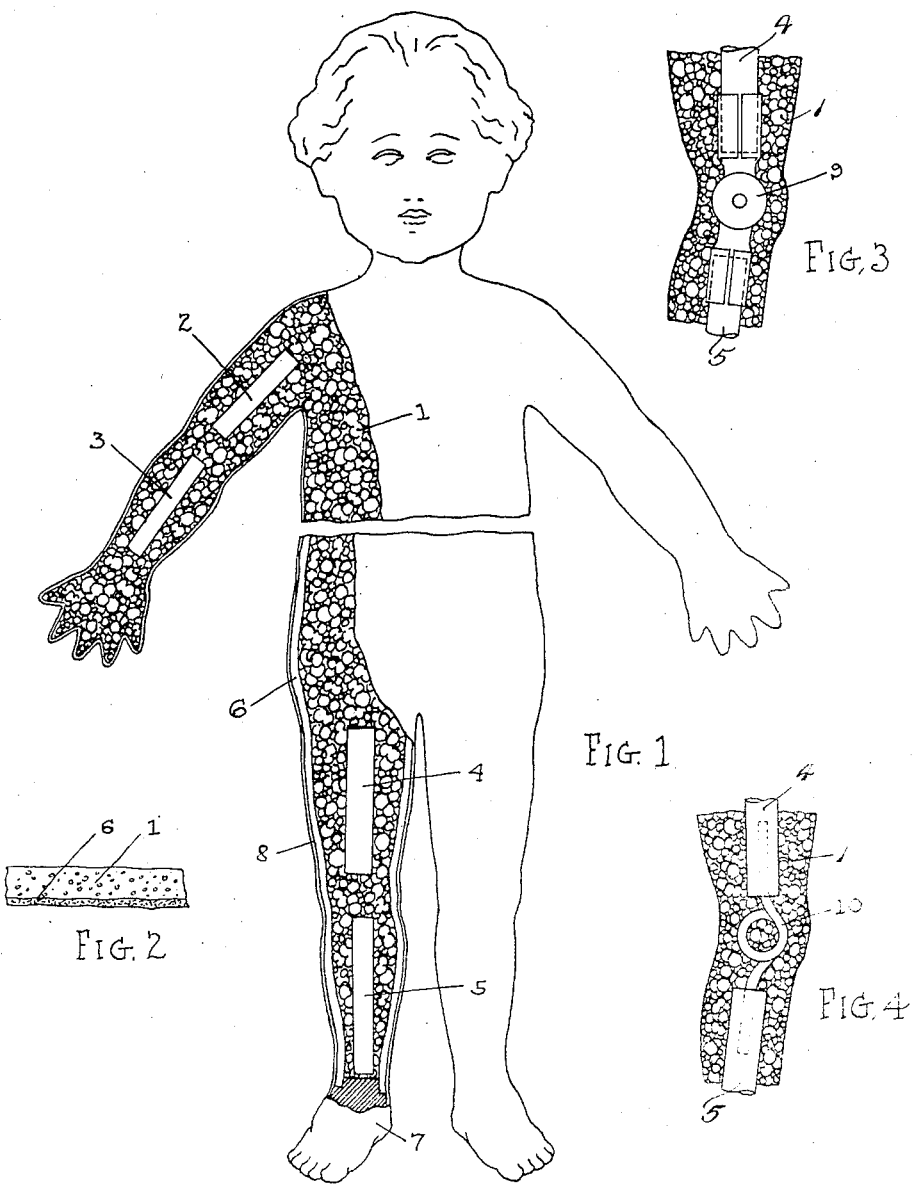

Aug. 10, 1926.

W. LEATHERS 1,595,203

TOY AND THE MANUFACTURE THEREOF

Filed Nov. 16, 1921

WITNESS
John Hugh O'Neil

INVENTOR
Ward Leathers

Patented Aug. 10, 1926.

1,595,203

UNITED STATES PATENT OFFICE.

WARD LEATHERS, OF HAWORTH, NEW JERSEY.

TOY AND THE MANUFACTURE THEREOF.

Application filed November 16, 1921. Serial No. 515,587.

My invention relates to toys of characteristics heretofore unknown and to the method of manufacturing same. Toys of the kind herein described will be soft and pliable and may be jointed to simulate the joints of the human body or that of animals. This construction is also suitable for other rubber goods where cushion-like qualities are desired together with beautiful surface finish.

This invention is a continuation of the work disclosed in my two former applications for Letters Patent on a similar subject.

I have carefully, completely set forth the mechanism and the process involved in my invention and appended suitable explanatory drawings, of which Fig. 1 is a partial cross-section of a doll.
Fig. 2 is a cross-section of a material used.
Fig. 3 is a cross-section of doll joint.
Fig. 4 is a cross-section of a modification of the same.

In Fig. 1, 1 is any pliable filler material, but for the purposes of this patent application I prefer to use the commercial material known as rubber sponge similar in composition to the rubber bath sponge. This material before moulding and vulcanizing is plastic and contains in liquid form an expandable gas as well as the vulcanizing agent. The gas, when subjected to the heat of vulcanizing makes the numerous communicating bubbles in the rubber. Any degree of communication may be obtained by varying the quantity or character of the expandible gas. 2, 3, 4 and 5 are rigid members preferably of wood for the purpose of making the doll bendable only at the joints. These may set into the image at the time of moulding.

This doll or other image or device is preferably moulded in a two piece mould and vulcanized therein.

Rubber sponge normally has less bubbles at the surface than in the interior and in some cases such moulded object will come out of the mould ready for dipping into liquid rubber to acquire its finish, a process described hereinafter.

In some cases a more uniform and less porous surface will be required on the image before dipping. In such case a sheet of non-sponging moulding rubber may be laid into the mould before the sponging stock is put in. This sheet will be seen at 6, Fig. 1.

A practical method of simplifying the labor of filling such mould is to roll the sponge stock 1 to the sheet 6 as in Fig. 2. The mould may then be lined with such combination sheet, with the non-sponging rubber next the mould. The sponge rubber, on vulcanizing, will then fill the mould.

At 7, Fig. 1, I have shown the foot moulded separately and rubber cemented to the image. Naturally any extremities may be applied in this manner, or the extremities or other parts of the image may be filled with unvulcanized non-sponging rubber compound at the time the mould is filled with sponging compound and the whole vulcanized together.

When the image or object is complete and vulcanized it may be dipped into rubber solution as "dipped" rubber goods are made and vapor or acid cured as "dipped" goods are cured on the form. My process of finishing rubber goods by dipping differs from other "dipped" goods processes in that other "dipped" goods must be removed from the form. Here the "dip" is vulcanized to the form. This dipping solution is composed of rubber gum dissolved in a volatile liquid and supplied with any desirable coloring or opaquing agents. This dipped skin may be dyed after curing if desired and if desired decorated or painted. In the case of a doll, features, pinker areas, hair and other coloring may be added. Or, if desired, portions of the image may be dipped in colored liquid gum before curing as for instance the feet may be dipped to produce the effect of colored socks. Naturally real hair may be attached if desired and glass eyes of the moving or non-moving kind may be provided or still other constructions may be added as known in the art or as described in my other aforementioned patent applications.

8 in Fig. 1 is the "dipped" skin.

Naturally my process is applicable to many lines of toys especially dolls and other objects. For example a toy animal may be made by this process but instead of "dipping" the entire animal the face and feet only may be dipped and the remainder of the figure covered with hair covered skin.

If desired, joints which will tend to bend more than the rest of the body may be obtained by using more expanding gas in the mixture placed in joints such as knees, elbows, etc., than is used in the remainder of the image.

In Fig. 3, 9 is a hinge shown in knee joint of a doll. This hinge may be entirely immersed in the rubber sponge and vulcanized therein. This joint may be provided with any suitable friction surfaces so that when the joint is bent it will keep its last position. This joint is applicable to any part of the object where a joint is desired. The hinge shown is composed of stamped metal pieces, the hinge ends of which are disc-shaped, conveniently put together by means of a grommet, or may have washers on the sides thereof and a grommet holding the combined parts. The attachment ends as shown in Figure 3 may be made to hold tightly to the pieces 4 and 5 by clamping the wings of the sheet metal stamping around them.

Fig. 4 is similar to Fig. 3 except that the friction hinge is replaced by a spring 10. The spring makes the joint return readily to its normal position. Such spring in a joint as in the knees of a doll or animal would make the image jump at the will of the operator. Toys so equipped are highly appreciated by small children. The spring 10 may have as many turns or coils as desired, and the ends may be attached to the parts 4 and 5 in the manner shown in Figure 4, namely, straight spring wire ends inserted into holes in said parts.

I claim—

1. In a toy, the combination of stiffening members, moulded sponge rubber flesh, dense rubber covering and a dipped rubber skin, said stiffening members vulcanized in place.

2. In a toy, the combination of stiffening members, joints connecting said members, moulded sponge rubber flesh, dense rubber covering and a dipped rubber skin, said members and joints vulcanized in place.

3. In a toy, the combination of stiffening members, spring joints connecting said members, moulded sponge rubber flesh, dense rubber covering and a dipped rubber skin, said members and joints vulcanized in place.

WARD LEATHERS.